Patented Nov. 3, 1942

2,300,587

UNITED STATES PATENT OFFICE 2,300,587

ADHESIVE

Adolf Menger, Krefeld-Uerdingen, Germany, assignor, by mesne assignments, to General Aniline & Film Corporation, New York, N. Y., a corporation of Delaware No Drawing. Application January 31, 1939, Serial No. 253,780. In Germany February 2, 1938

7 Claims. (Cl. 260—32)

This invention relates to improvements in adhesives.

It is known, for example in accordance with my U. S. Patent No. 2,142,279, filed January 31, 1934, to employ halogenated polyvinyl halides or their depolymerisation products, if desired with the addition of customary adhesive agents, as adhesives.

In accordance with my present invention adhesives of particularly valuable properties are obtained by incorporating certain polyvinylethers into chlorinated polyvinyl chlorides and especially partially depolymerised chlorinated polyvinyl chlorides, such as are obtainable for example in accordance with the U. S. Patent 1,982,765, filed May 9, 1933, by Schönburg, by further chlorination of polyvinyl chloride in the presence of solvents or agents promoting the formation of suspensions.

The polyvinyl ethers suitable for the purpose of this invention are polyvinyl methyl ether and polyvinyl ethyl ether and polymerisates from mixtures of these vinyl ethers with one another and with vinyl ethers of the higher aliphatic, aromatic or alicyclic alcohols with up to 35 carbon atoms.

The adhesive films produced with the aid of such an adhesive are distinguished by a particularly high strength combined with a considerably higher flexibility compared with the known adhesive films produced on a basis of halogenated polyvinyl chlorides without additions of polyvinyl ethers, and the flexibility can be still further increased by the addition of softening agents, such as phosphoric acid-, phthalic acid- and adipic acid esters, of amides of p-toluene-sulphonic acid, of castor oil or of ethyl acetanilide.

For the manufacture of adhesives the chlorinated polyvinyl chlorides in admixture with the polyvinyl ethers can be employed as such or in admixture with other adhesives or with additions customarily used for adhesives; thus there can be added solvents, such as acetone, the methyl, ethyl and butyl esters of acetic acid, or mixtures of the said solvents with benzene, toluene and the like and softening agents, as already indicated. Moreover, it will be possible to incorporate with the adhesive natural and artificial resins, such as pine resin and copal, cumarone resin and resin-like condensation products obtainable from polybasic and monobasic carboxylic acids with polyvalent alcohols, as well as pigments, fillers and fibrous materials, such as iron oxide, zinc oxide, chromium oxide, wood meal, asbestos powder, powdered shale, flock, asbestos fibres and the like.

The adhesives of this invention can be employed for the adhesion of constructional materials of various kinds, as for example for the adhesion of stone ware, porcelain, metal, glass, wood, artificial materials, such as galalith, phenol formaldehyde condensation products and so on. On account of their high flexibility they are particularly suited for the adhesion of flexible materials, as for example of textiles and leather, further also of rubber, particularly with leather or textiles. Such adhesions are exposed to the most stringent requirements of continual bending, as for example in the case of leather for driving and transporting belt, which requirements were hitherto only fulfilled with the application of rubber adhesives, the known disadvantages of which therefore had to be reckoned with.

It is to be understood, that each of the materials mentioned before may be cemented as well with material of the same kind as with one of the other materials named.

The products obtained according to this process can also be employed for impregnation, in particular for the impregnation of leather.

The invention is illustrated by the following examples without being restricted thereto; the parts are by weight:

Example 1

A leather adhesion produced by applying adhesive and subjecting to pressure, using as adhesive a solution of 20 parts of partially depolymerised chlorinated polyvinyl chloride (produced according to Example 1 of U. S. Patent No. 1,982,765) and 14 parts of polyvinyl methyl ether in 66 parts of ethyl acetate is distinguished by great strength and high flexibility.

Example 2

By employing instead of the adhesive solution mentioned in Example 1 a solution of 20 parts by weight of partially depolymerised chlorinated polyvinyl chloride and 8 parts of polyvinyl methyl ether in 68 parts of ethyl acetate with the addition of 4 parts of tricresyl phosphate, the leather joint produced therewith exhibits essentially the properties mentioned in Example 1, but excels, however, the joint produced according to Example 1, in flexibility owing to the presence of softening agents.

I claim:

1. An adhesive comprising a partially depolymerised chlorinated polyvinyl chloride and a polyvinyl ether selected from the class consisting of polyvinyl methyl ether and polyvinyl ethyl ether in proportions of from about 1:0.7 to about 1:0.4.

2. An adhesive comprising a chlorinated polyvinyl chloride and a polyvinyl ether selected from the class consisting of polyvinyl methyl ether and polyvinyl ethyl ether in proportions of from about 1:0.7 to about 1:0.4.

3. An adhesive comprising a chlorinated polyvinyl chloride and a polyvinyl ether selected from the class consisting of polyvinyl methyl ether and polyvinyl ethyl ether in proportions of from about 1:0.7 to about 1:0.4, and a solvent therefor.

4. An adhesive comprising a chlorinated polyvinyl chloride and a polyvinyl ether selected from the class consisting of polyvinyl methyl ether and polyvinyl ethyl ether in proportions of from about 1:0.7 to about 1:0.4, a solvent therefor, and a softening agent.

5. An adhesive comprising a partially depolymerised chlorinated polyvinyl chloride and polyvinyl methyl ether in proportions of from about 1:0.7 to about 1:0.4.

6. An adhesive comprising a solution of partially depolymerised chlorinated polyvinyl chloride and polyvinyl methyl ether in proportions of from about 1:0.7 to about 1:0.4 in ethyl acetate.

7. An adhesive comprising a solution of partially depolymerised chlorinated polyvinyl chloride and polyvinyl methyl ether in proportions of from about 1:0.7 to about 1:0.4 and tricresyl phosphate in ethyl acetate.

ADOLF MENGER.